United States Patent
Thomas et al.

(10) Patent No.: US 9,136,995 B2
(45) Date of Patent: Sep. 15, 2015

(54) CODEBOOK PARTITIONING FOR ENABLING ELEVATION-EICIC

(71) Applicant: Nokia Siemens Networks Oy, Espoo (FI)

(72) Inventors: Timothy Thomas, Palatine, IL (US); Bishwarup Mondal, Beavercreek, OH (US); Frederick Vook, Schaumburg, IL (US); Eugene Visotsky, Buffalo Grove, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 135 days.

(21) Appl. No.: 13/908,548

(22) Filed: Jun. 3, 2013

(65) Prior Publication Data

US 2014/0355702 A1    Dec. 4, 2014

(51) Int. Cl.
*H04B 7/06* (2006.01)
*H04L 5/00* (2006.01)
*H04B 7/04* (2006.01)

(52) U.S. Cl.
CPC ............ *H04L 5/0032* (2013.01); *H04B 7/0456* (2013.01); *H04B 7/0478* (2013.01); *H04B 7/0617* (2013.01)

(58) Field of Classification Search
CPC .. H04L 5/0032; H04B 7/0617; H04B 7/0456; H04B 7/0478
USPC .................................. 375/259, 260, 295, 296
See application file for complete search history.

(56) References Cited

U.S. PATENT DOCUMENTS

| | | | |
|---|---|---|---|
| 2013/0010850 A1* | 1/2013 | Li et al. .......................... | 375/219 |
| 2014/0198744 A1* | 7/2014 | Wang et al. .................... | 370/329 |
| 2014/0211731 A1 | 7/2014 | Inoue et al. | |

FOREIGN PATENT DOCUMENTS

| | | |
|---|---|---|
| EP | 2747304 A1 | 6/2014 |
| WO | WO 2012/158959 A1 | 11/2012 |
| WO | WO 2013/024852 A1 | 2/2013 |

OTHER PUBLICATIONS

3GPP TS 36.213 V11.2.0 (Feb. 2013) 3rd Generation Partnership Project: Technical Specification Group Radio Access Network; Evolved Universal Terrestrial Radio Access (E-UTRA); Physical layer procedures (Release 11) (173 pages).
Sesia et al., editors, "LTE—The UMTS Long Term Evolution: From Theory to Practice", Chapter 11, "Multiple Antenna Techniques" (Gasbert et al.), §11.2.2.4, first edition (2009) (pp. 243-283).

(Continued)

*Primary Examiner* — Vineeta Panwalkar
(74) *Attorney, Agent, or Firm* — Harrington & Smith

(57) ABSTRACT

A method includes receiving a number of indicators from a number of UEs. Each value of an indicator corresponds to entry(ies) of a codebook the corresponding UE recommends to be used for transmission. The method includes assigning the UE to a number of groups, including a first group of UEs having values of indicators corresponding to first codebook entries that when applied to an antenna array produce a pattern in elevation that steers a beam away from an underlying cell, and a second group of UEs having values of indicators corresponding to second codebook entries that are different from the first codebook entries. The method includes transmitting, in a first set of RBs having a first characteristic, to the UEs in the first group and transmitting, in a second set of RBs having a second, different characteristic, to the UEs in the second group. Apparatus and program products are disclosed.

25 Claims, 11 Drawing Sheets

(56) References Cited

OTHER PUBLICATIONS

Sesia et al., editors, "LTE—The UMTS Long Term Evolution: From Theory to Practice", Chapter 6, "Introduction to Downlink Physical Layer Design" (Matthew Baker), first edition (2009) (pp. 135-140).
ZTE; "Remaining issues on configuration of CSI process and IMR"; 3GPP Draft R1-124196; 3GPP TSG RAN WG1 Meeting #70bis; San Diego, USA; Oct. 8-12, 2012; p. 4; 3rd Generation Partnership Project (3GPP), Mobile Competence Centre, 650, Route des Lucioles, F-06921 Sophia-Antipolis; XP050662105; retrieved from the Internet: URL:http://www.3gpp.org/ftp/tsg_ran/WG1_RL1/TSGR1_70b/Docs/ [retrieved on Sep. 29, 2012].

Alcatel-Lucent Shanghai Bell et al.; "Considerations on CSI feedback enhancements for high-priority antenna configurations"; 3GPP Draft R1-112420; 3GPP TSG-RAN WG1 #66; Athens, Greece; Aug. 22-26, 2011; pp. 4-5; 3rd Generation Partnership Project (3GPP), Mobile Competence Centre, 650, Route des Lucioles, F-06921 Sophia-Antipolis; XP050537814, [retrieved on Aug. 18, 2011].

* cited by examiner

CODEBOOK PARTITIONING FOR ENABLING ELEVATION-EICIC

TECHNICAL FIELD

This invention relates generally to wireless transmissions and, more specifically, relates to antenna and codebook usage in wireless transmissions.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below at the end of the specification but prior to the claims.

Wireless traffic volumes are dramatically outstripping macro cellular capability. One technique for providing improved traffic volumes is to add smaller cells to an area. For instance, a macro cell might provide coverage over a larger area, where there are multiple smaller cells underlying this larger coverage area. Such a configuration may be referred to as a heterogeneous network (HetNet). In this manner, users within the smaller cells share data resources amongst a smaller set of users and typically the HetNet configuration can provide higher capacity and a faster network overall.

A problem with smaller cells-larger cell interaction is that the more powerful (e.g., in terms of transmission power) larger cell can cause interference to the less powerful small cell and the user equipment being serviced by the smaller cell. One technique for reducing this interference is to provide almost-blank sub frames (ABSs) or low power subframes (LPSs), during which the macro transmits using relatively low power and a smaller cell schedules transmission and reception with user equipment which would have experienced an unacceptably high interference from the macro cell if the macro transmitted at full power. The macro and smaller cells coordinate the ABSs and LPSs.

Although ABSs and LPSs are an improvement over wireless networks without these techniques, interference mitigation for macro and smaller cells can still be improved.

SUMMARY

This section contains examples of possible implementations and is not meant to be limiting.

In an exemplary embodiment, a method is disclosed that includes receiving in a feedback process, at a base station forming at least one cell having a coverage area that at least partially overlies a coverage area of an underlying cell, a plurality of indicators from a plurality of user equipment in the at least one cell. Each value of an indicator corresponds to one or more entries of a codebook the corresponding user equipment recommends to be used for transmission to the user equipment. The method includes assigning the user equipment to a plurality of groups. The plurality of groups comprise a first group of user equipment having values of indicators corresponding to first codebook entries that when applied to an antenna array produce a pattern in elevation that steers a beam away from the underlying cell, and a second group of user equipment having values of indictors corresponding to second codebook entries that are different from the first codebook entries. The method includes transmitting, in a first set of resource blocks having a first characteristic, to the user equipment in the first group by applying to the antenna array the codebook entries corresponding to the indicators indicated in the feedback process by the user equipment in the first group. The method includes transmitting, in a second set of resource blocks having a second characteristic, to the user equipment in the second group by applying to the antenna array the codebook entries corresponding to the indicators indicated in the feedback process by the user equipment in the second group. The first characteristic and the second characteristic are different.

An apparatus is also disclosed that comprises: means for receiving in a feedback process, at a base station forming at least one cell having a coverage area that at least partially overlies a coverage area of an underlying cell, a plurality of indicators from a plurality of user equipment in the at least one cell, each value of an indicator corresponding to one or more entries of a codebook the corresponding user equipment recommends to be used for transmission to the user equipment; means for assigning the user equipment to a plurality of groups, the plurality of groups comprising a first group of user equipment having values of indicators corresponding to first codebook entries that when applied to an antenna array produce a pattern in elevation that steers a beam away from the underlying cell, and a second group of user equipment having values of indictors corresponding to second codebook entries that are different from the first codebook entries; means for transmitting, in a first set of resource blocks having a first characteristic, to the user equipment in the first group by applying to the antenna array the codebook entries corresponding to the indicators indicated in the feedback process by the user equipment in the first group; and means for transmitting, in a second set of resource blocks having a second characteristic, to the user equipment in the second group by applying to the antenna array the codebook entries corresponding to the indicators indicated in the feedback process by the user equipment in the second group, where the first characteristic and the second characteristic are different.

An additional exemplary embodiment includes a computer program, comprising code for receiving in a feedback process, at a base station forming at least one cell having a coverage area that at least partially overlies a coverage area of an underlying cell, a plurality of indicators from a plurality of user equipment in the at least one cell, each value of an indicator corresponding to one or more entries of a codebook the corresponding user equipment recommends to be used for transmission to the user equipment; code for assigning the user equipment to a plurality of groups, the plurality of groups comprising a first group of user equipment having values of indicators corresponding to first codebook entries that when applied to an antenna array produce a pattern in elevation that steers a beam away from the underlying cell, and a second group of user equipment having values of indictors corresponding to second codebook entries that are different from the first codebook entries; code for transmitting, in a first set of resource blocks having a first characteristic, to the user equipment in the first group by applying to the antenna array the codebook entries corresponding to the indicators indicated in the feedback process by the user equipment in the first group; and code for transmitting, in a second set of resource blocks having a second characteristic, to the user equipment in the second group by applying to the antenna array the codebook entries corresponding to the indicators indicated in the feedback process by the user equipment in the second group, where the first characteristic and the second characteristic are different; when the computer program is run on a processor. The computer program according to this paragraph, wherein the computer program is a computer program product comprising a computer-readable medium bearing computer program code embodied therein for use with a computer.

An exemplary apparatus includes one or more processors and one or more memories including computer program code. The one or more memories and the computer program code are configured to, with the one or more processors, cause the apparatus to perform at least the following: receiving in a feedback process, at a base station forming at least one cell having a coverage area that at least partially overlies a coverage area of an underlying cell, a plurality of indicators from a plurality of user equipment in the at least one cell, each value of an indicator corresponding to one or more entries of a codebook the corresponding user equipment recommends to be used for transmission to the user equipment; assigning the user equipment to a plurality of groups, the plurality of groups comprising a first group of user equipment having values of indicators corresponding to first codebook entries that when applied to an antenna array produce a pattern in elevation that steers a beam away from the underlying cell, and a second group of user equipment having values of indictors corresponding to second codebook entries that are different from the first codebook entries; transmitting, in a first set of resource blocks having a first characteristic, to the user equipment in the first group by applying to the antenna array the codebook entries corresponding to the indicators indicated in the feedback process by the user equipment in the first group; and transmitting, in a second set of resource blocks having a second characteristic, to the user equipment in the second group by applying to the antenna array the codebook entries corresponding to the indicators indicated in the feedback process by the user equipment in the second group, where the first characteristic and the second characteristic are different.

An exemplary computer program product includes a computer-readable storage medium bearing computer program code embodied therein for use with a computer. The computer program code includes: code for receiving in a feedback process, at a base station forming at least one cell having a coverage area that at least partially overlies a coverage area of an underlying cell, a plurality of indicators from a plurality of user equipment in the at least one cell, each value of an indicator corresponding to one or more entries of a codebook the corresponding user equipment recommends to be used for transmission to the user equipment; code for assigning the user equipment to a plurality of groups, the plurality of groups comprising a first group of user equipment having values of indicators corresponding to first codebook entries that when applied to an antenna array produce a pattern in elevation that steers a beam away from the underlying cell, and a second group of user equipment having values of indictors corresponding to second codebook entries that are different from the first codebook entries; code for transmitting, in a first set of resource blocks having a first characteristic, to the user equipment in the first group by applying to the antenna array the codebook entries corresponding to the indicators indicated in the feedback process by the user equipment in the first group; and code for transmitting, in a second set of resource blocks having a second characteristic, to the user equipment in the second group by applying to the antenna array the codebook entries corresponding to the indicators indicated in the feedback process by the user equipment in the second group, where the first characteristic and the second characteristic are different.

DETAILED DESCRIPTION OF THE DRAWINGS

Figure 1:
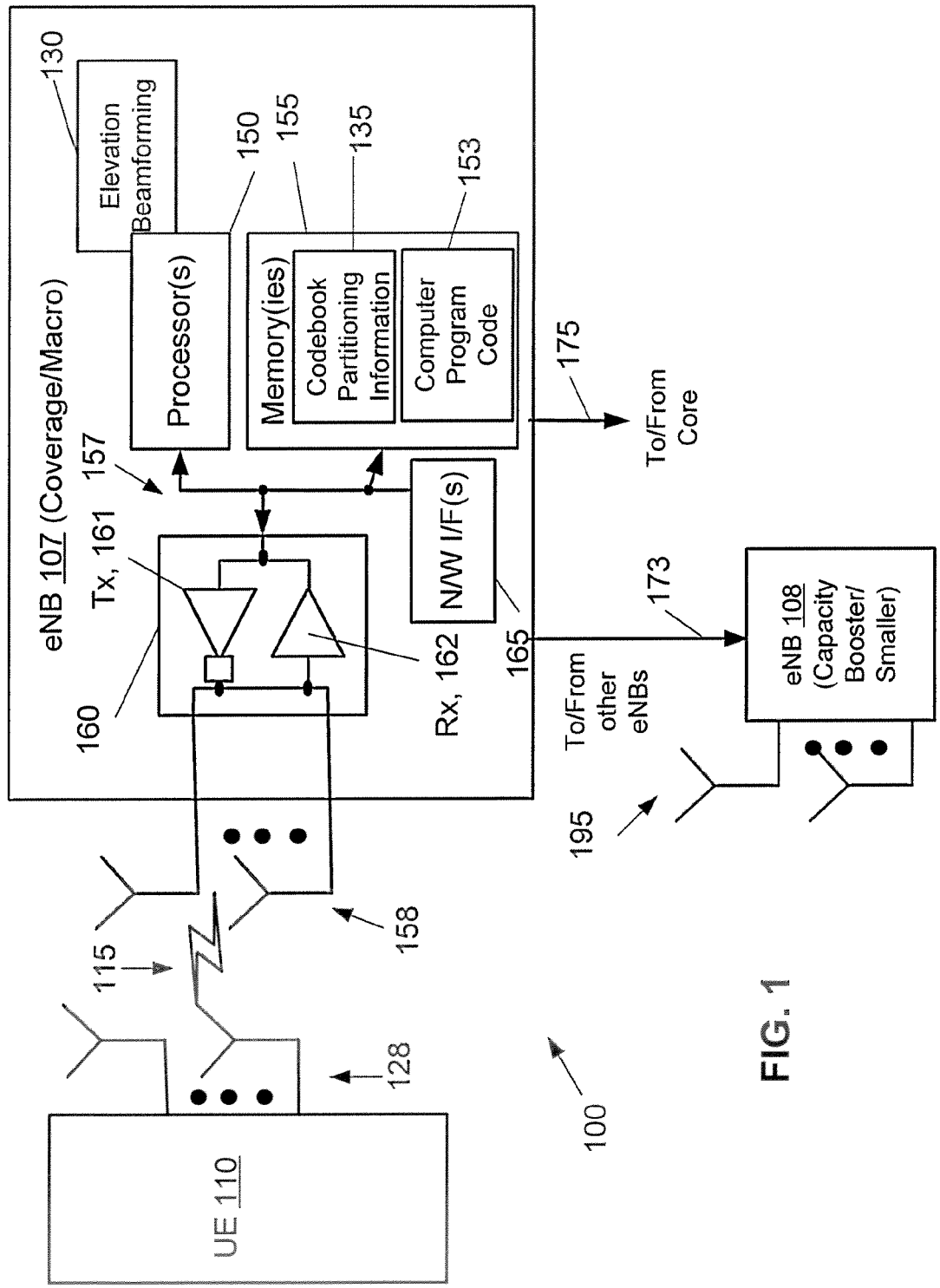
FIG. 1 illustrates an exemplary system in which the exemplary embodiments may be practiced.

Before proceeding with the description of additional problems with conventional systems and how exemplary embodiments address these problems, reference is now made to FIG. 1, which illustrates an exemplary system in which the exemplary embodiments may be practiced. In FIG. 1, a user equipment (UE) 110 is in wireless communication with a wireless network 100 via a wireless link 115 with eNB 107, which is an LTE base station (in this example) providing access to and from the wireless network 100. The user equipment 110 includes one or more antennas 128.

The wireless network 100 includes the eNB 107. Although an LTE base station is used herein as an example, the exemplary embodiments are applicable to any wireless transmission system. The eNB 107 creates a "macro cell" (also called a coverage cell) and includes one or more processors 150, one or more memories 155, one or more network interfaces (N/W I/F(s)) 165, and one or more transceivers 160 (each comprising a transmitter, Tx, 161 and a receiver, Rx, 162) interconnected through one or more buses 157. The one or more transceivers are connected to the antenna array 158. The one or more memories 155 include computer program code 153. An elevation beamforming module 130 may be implemented via the computer program code 153, via circuitry such as circuitry in the one or more processors 150, of via a combination of these. In an exemplary embodiment, the one or more memories 155 and the computer program code 153 are configured to, with the one or more processors 150, cause the eNB 107 to perform one or more of the operations as described herein. The one or more memories include codebook partitioning information 135, which is used by the elevation beamforming module 130 to perform elevation beamforming as described below.

The one or more network interfaces 165 communicate over networks such as the networks 173, 175. The eNB 107 may communicate with other eNBs such as the eNB 108 using, e.g., network 173. The network 173 may be wired or wireless or both and may implement, e.g., an X2 interface. The eNB 107 may use the network 175 to communicate with a core portion of the wireless network 100.

The eNB 108 creates a smaller cell (also called a capacity booster cell). The eNB 108 is assumed to contain elements similar to those in the eNB 107, such as antenna(s) 195. Other elements of eNB 108 are not shown.

The computer readable memory 155 may be of any type suitable to the local technical environment and may be implemented using any suitable data storage technology, such as semiconductor based memory devices, flash memory, magnetic memory devices and systems, optical memory devices and systems, fixed memory and removable memory. The processor(s) 150 may be of any type suitable to the local technical environment, and may include one or more of general purpose computers, special purpose computers, general or special purpose integrated circuits, microprocessors, digital signal processors (DSPs) and processors based on a multi-core processor architecture, as non-limiting examples.

As stated above, Interference mitigation for macro and smaller cells can still be improved. Two-dimensional eNB antenna array structures have been proposed. These structures enable transmit adaptation in the elevation dimension in addition to the azimuth dimension. Thus, they provide sector-specific elevation beamforming (vertical sectorization) that is used to create two vertical sectors out of what was originally one azimuth-only sector. Certain systems may provide UE-specific elevation beamforming. Elevation steering may be provided on a UE-specific basis, and these systems add vertical beamsteering to existing azimuth-only CL-SU/MU-MIMO methods.

Figure 2:
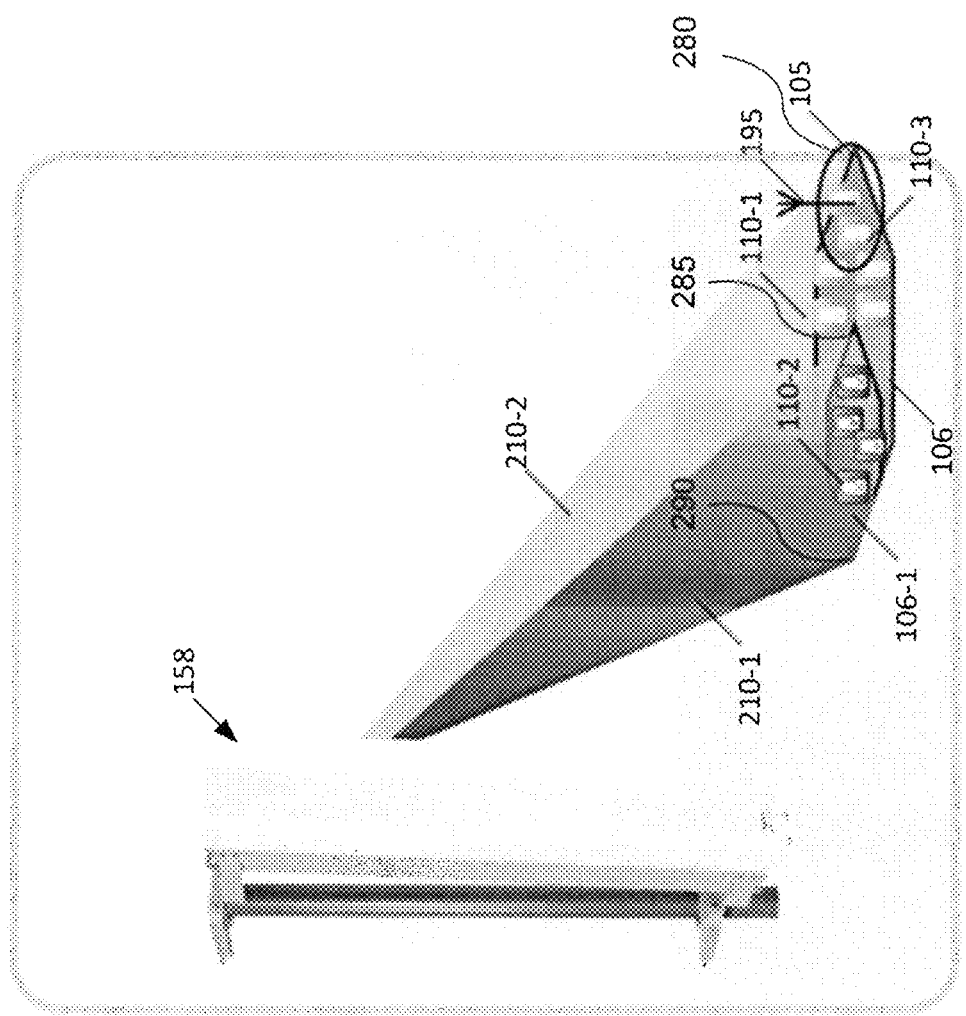
FIG. 2 illustrates an active antenna system performing vertical sectorization.

FIG. 2 illustrates an active antenna system performing vertical sectorization. In this example, there is a "coverage" cell (also called an original cell) 106 that is a "macro" cell and is defined by the antenna array 158, having a particular geometry, of the eNB 107. There is also a capacity booster cell 105 (also called a candidate cell), which is a smaller cell whose coverage area underlies the coverage area of the coverage cell 106. The capacity booster cell 105 is located near the outer edge 280 of the cell 106 in this example. Also shown are a center 285 and an inner edge 290 of the coverage cell 106. The capacity booster cell 105 has a coverage area that underlies the (overlying) coverage area of the coverage cells 106. The terms "inner" and "outer" are relative to the antenna array 158: "inner" is closer to the antenna array 158 and "outer" is farther from the antenna array 158.

It is noted that description herein indicates that "cells" perform functions, but it should be clear that the eNB that forms the cell will perform the functions. The cell makes up part of an eNB. That is, there can be multiple cells per eNB. For instance, there could be three cells for a single eNB carrier frequency and associated bandwidth, each cell covering one-third of a 360 degree area so that the single eNB's coverage area covers an approximate oval or circle. Furthermore, each cell can correspond to a single carrier and an eNB may use multiple carriers. So if there are three 120 degree cells per carrier and two carriers, then the eNB has a total of 6 cells. For ease of reference, cells and their coverage areas are referred to as cells herein, and the cells are discussed as performing actions (which would be performed by the corresponding eNB).

A classical system would use the antenna array 158 to create the cell 106 via the beam 210-2, which would be able to communicate with all UEs 110, of which three are referenced in FIG. 2. Assuming that eNB 108 creates the capacity booster cell 105 and UE 110-3 is connected to the capacity booster cell 105. should both the capacity booster cell 105 and the coverage cell 106 transmit at the same time, the capacity booster cell 105 will have high interference (as will the UE 110-3). One way to improve the high interference is through ABSs and LPSs as described above and coordination of the same between the coverage cell 106 and the capacity booster cell 105. 31

With sector-specific elevation beamforming, the smaller cell portion 106-1 may be created using beam 210-1. This would also occur with UE-specific beamforming, e.g., if the coverage cell 106 performs beamforming to target UE 110-2. The smaller cell portion 106-1 has the potential effect of reducing interference to capacity booster cell 105. However, UE 110-1 is not within the coverage area of capacity booster cell 105, and therefore the coverage cell 106 has to create beam 210-2 to adequately serve UE 110-1, which again leads to interference between the capacity booster cell 105 and the coverage cell 106.

The instant exemplary embodiments provide techniques for codebook partitioning for enabling elevation-eICIC. Before proceeding with a description of exemplary embodiments, it is helpful to review techniques for horizontal and vertical beamforming and eICIC.

Figure 3:
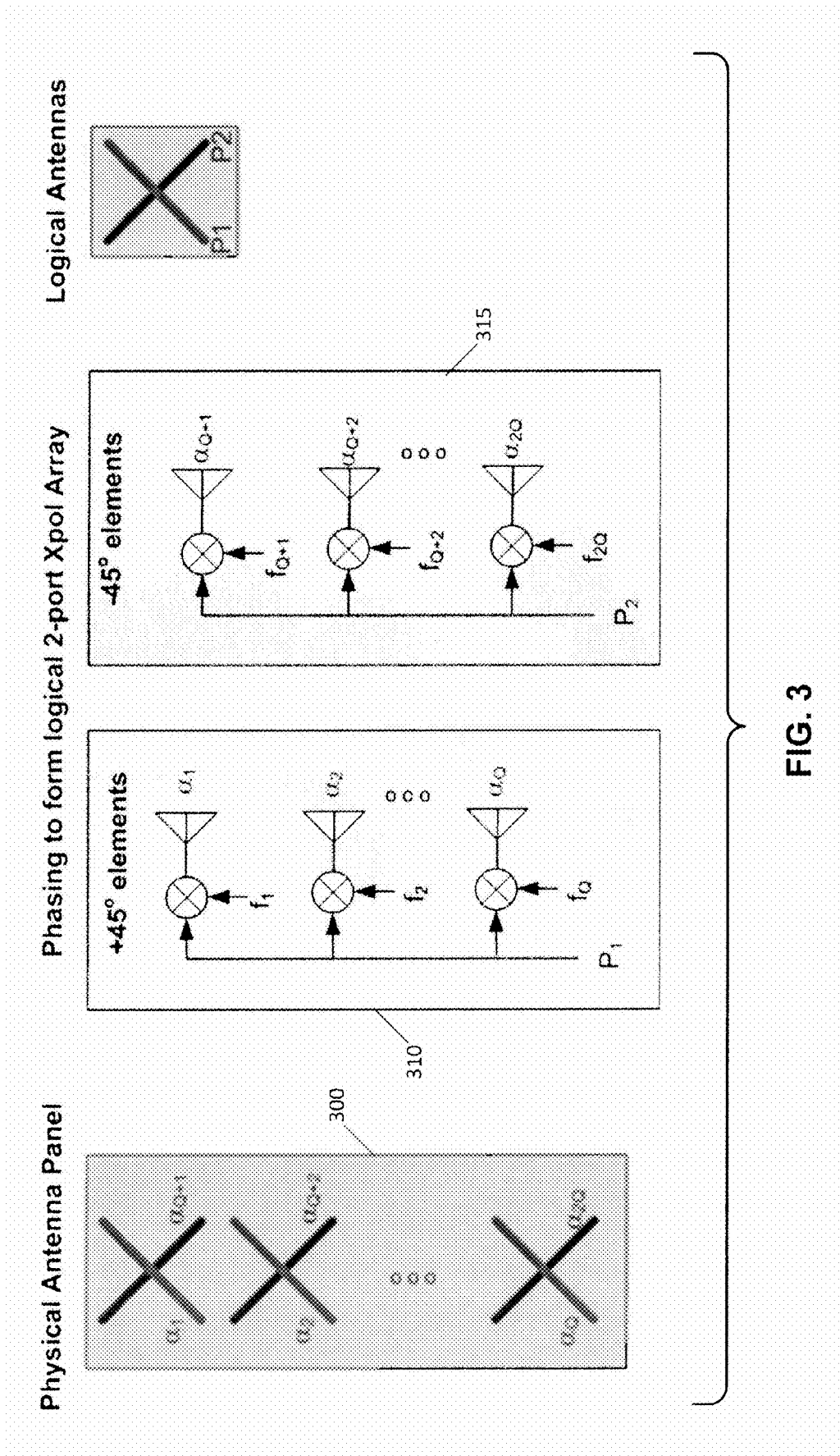
FIG. 3 is a block diagram of how an existing antenna array is used to form a desired vertical pattern.

Concerning beamforming using antenna arrays, FIG. 3 is a block diagram of how existing an antenna array is used to form a desired vertical pattern. Existing antenna panels typically already have vertical elements phased to form a desired vertical pattern. An example, as shown in FIG. 3 is Q physical sub-elements per polarization (e.g., Q=10). In this example, the physical antenna panel 300 includes $\alpha_1$ to $\alpha_Q$ +45 degree (°) antenna elements and $\alpha_{Q+1}$ to $\alpha_{2Q}$ −45 degree (°) antenna elements. To form logical antenna P1, phasing $f_1$ to $f_Q$ is applied to the +45° antenna elements by a phasing array 310, and to form logical antenna P2, phasing $f_{Q+1}$ to $f_{2Q}$ is applied to the −45° antenna elements by a phasing array 315. respectively.

Figure 4:
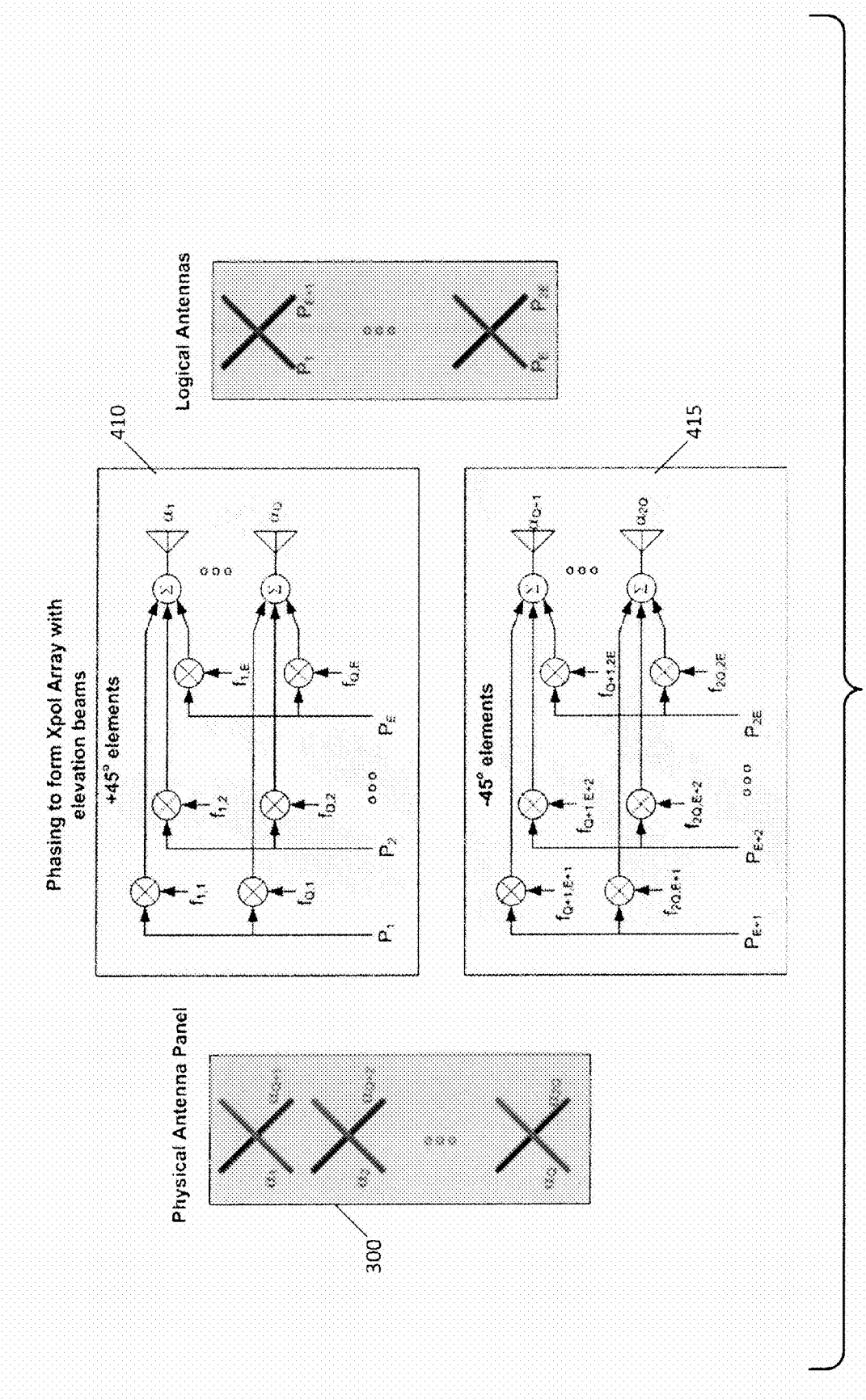
FIG. 4 is an example of using an antenna array to form vertical beams using all vertical antenna sub-elements.
Figure 5:
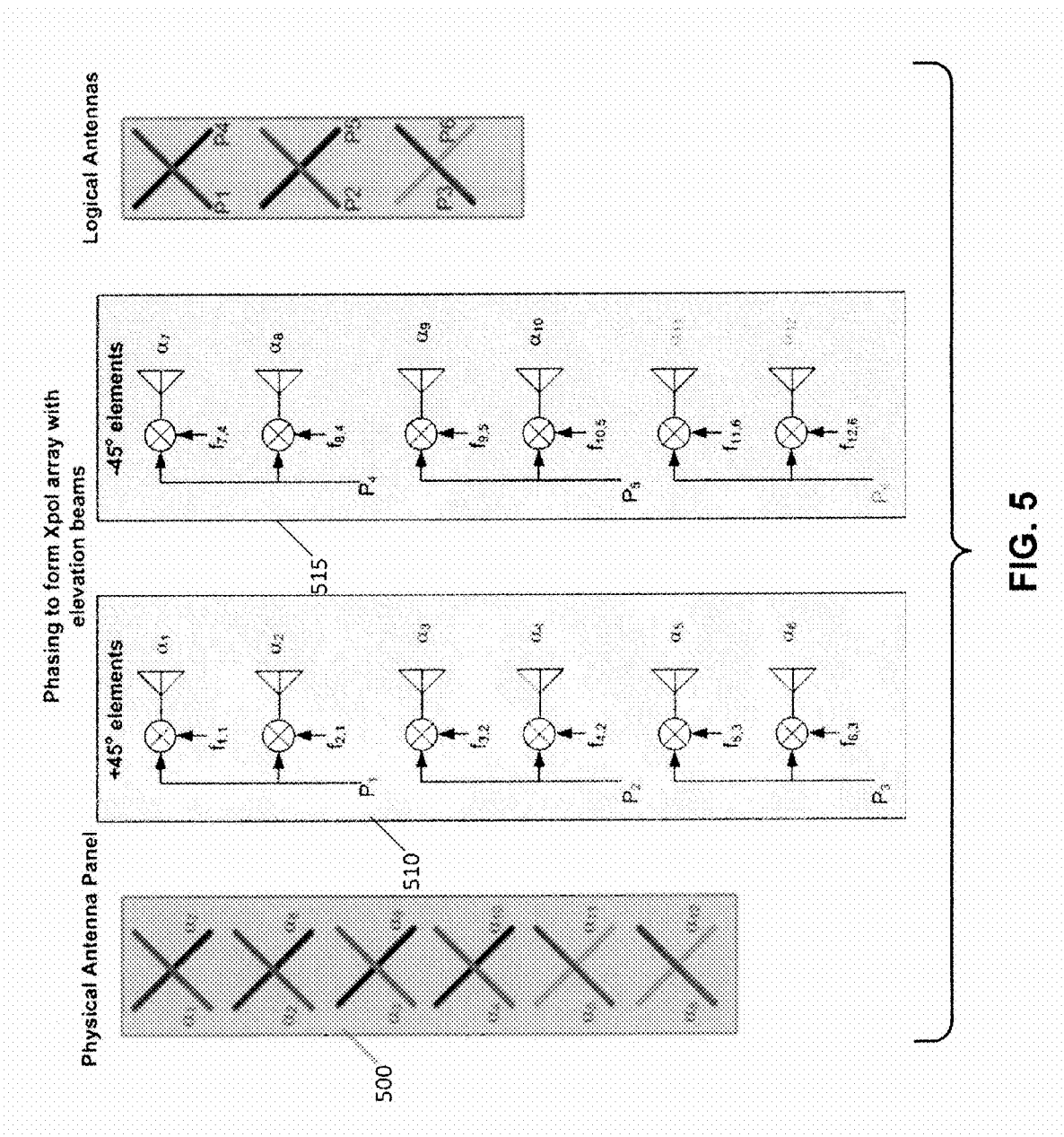
FIG. 5 is an example of using an antenna array to form vertical beams using disjoint subsets of vertical antenna sub-elements.

It is possible to modify beamforming using the physical antenna panel 300 to provide reduced-order control of the vertical dimension with performance similar to full control of the Q sub-elements for each polarization. For each polarization, multiple vertical beams may be formed using a combination of the Q sub-elements thus creating multiple logical vertical elements. An example is Q=10 physical sub-elements with two vertical logical antennas per polarization which will require 2 RF chains per polarization rather than 10 RF chains. FIGS. 4 and 5 are examples of using modified antenna panels.

FIG. 4 is an example of using an antenna array to form E vertical ports per polarization using all vertical antenna sub-elements. To form logical antennas $P_1$ to $P_E$, phasing $f_{1,1}$ to $f_{1,E}$ and $f_{Q,1}$ to $f_{Q,E}$ is applied to the +45° antenna elements by a phasing array 410, and to form logical antennas $P_{E+1}$ to $P_{2E}$, phasing $f_{Q+1,E+1}$ to $f_{Q+1,2E}$ to $f_{2Q,2E}$ is applied to the −45° antenna elements by a phasing array 415. The phasing values $f_{1,1}$ through $f_{Q,1}$ are the vertical beam for logical port $P_1$, the phasing values $f_{1,2}$ through $f_{Q,2}$ are the vertical beam for logical port $P_2$, and so forth. The phasing values $f_{Q+1,E+1}$ through $f_{2Q,E+1}$ are the vertical beam for logical port $P_{E+1}$, the phasing values $f_{Q+1,E+2}$ through $f_{2Q,E+2}$ are the vertical beam for logical port $P_{E+2}$, and so forth.

FIG. 5 is an example of using an antenna array to form 3 vertical ports per polarization using disjoint subsets of vertical antenna sub-elements. To form logical antenna $P_1$, phasing $f_{1,1}$ and $f_{2,1}$ is applied to the +45° antenna elements $\alpha_1$ and $\alpha_2$ by a phasing array 510; to form logical antenna $P_2$, phasing $f_{3,2}$ and $f_{4,2}$ is applied to the +45° antenna elements $\alpha_3$ and $\alpha_4$ by the phasing array 510; and to form logical antenna $P_3$, phasing $f_{5,3}$ and $f_{6,3}$ is applied to the +45° antenna elements $\alpha_5$ and $\alpha_6$ by the phasing array 510. Similarly, to form logical antenna $P_4$, phasing $f_{7,4}$ and $f_{8,4}$ is applied to the −45° antenna elements $\alpha_7$ and $\alpha_8$ by a phasing array 515; to form logical antenna $P_5$, phasing $f_{9,5}$ and $f_{10,5}$ is applied to the −45° antenna elements $\alpha_9$ and $\alpha_{10}$ by the phasing array 515; and to form logical antenna $P_6$, phasing $f_{11,6}$ and $f_{12,6}$ is applied to the −45° antenna elements $\alpha_{11}$ and $\alpha_{12}$ by the phasing array 515.

Figure 6:
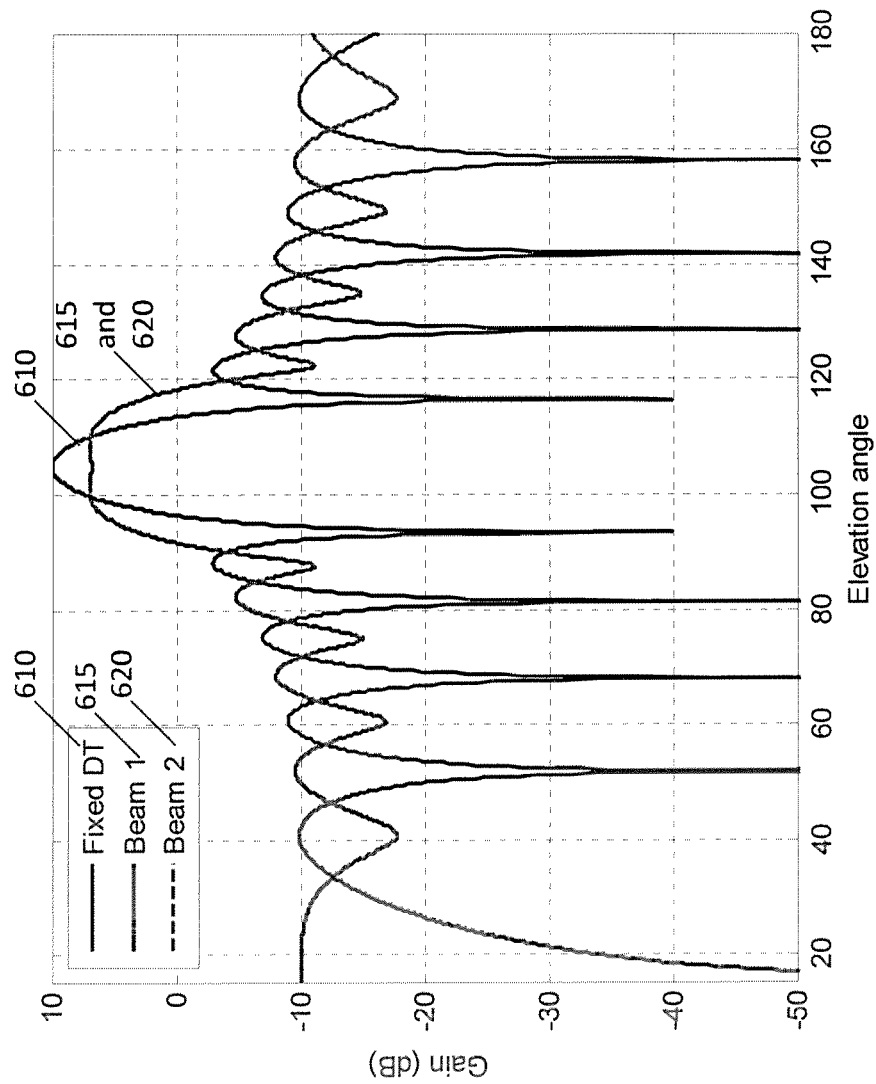
FIG. 6 is a graph of gain of two fixed beams compared to a fixed downtilt beam and FIG. 7 is a graph of phase of the two fixed beams relative to the fixed downtilt beam for an example set of beamspace weights.
Figure 7:
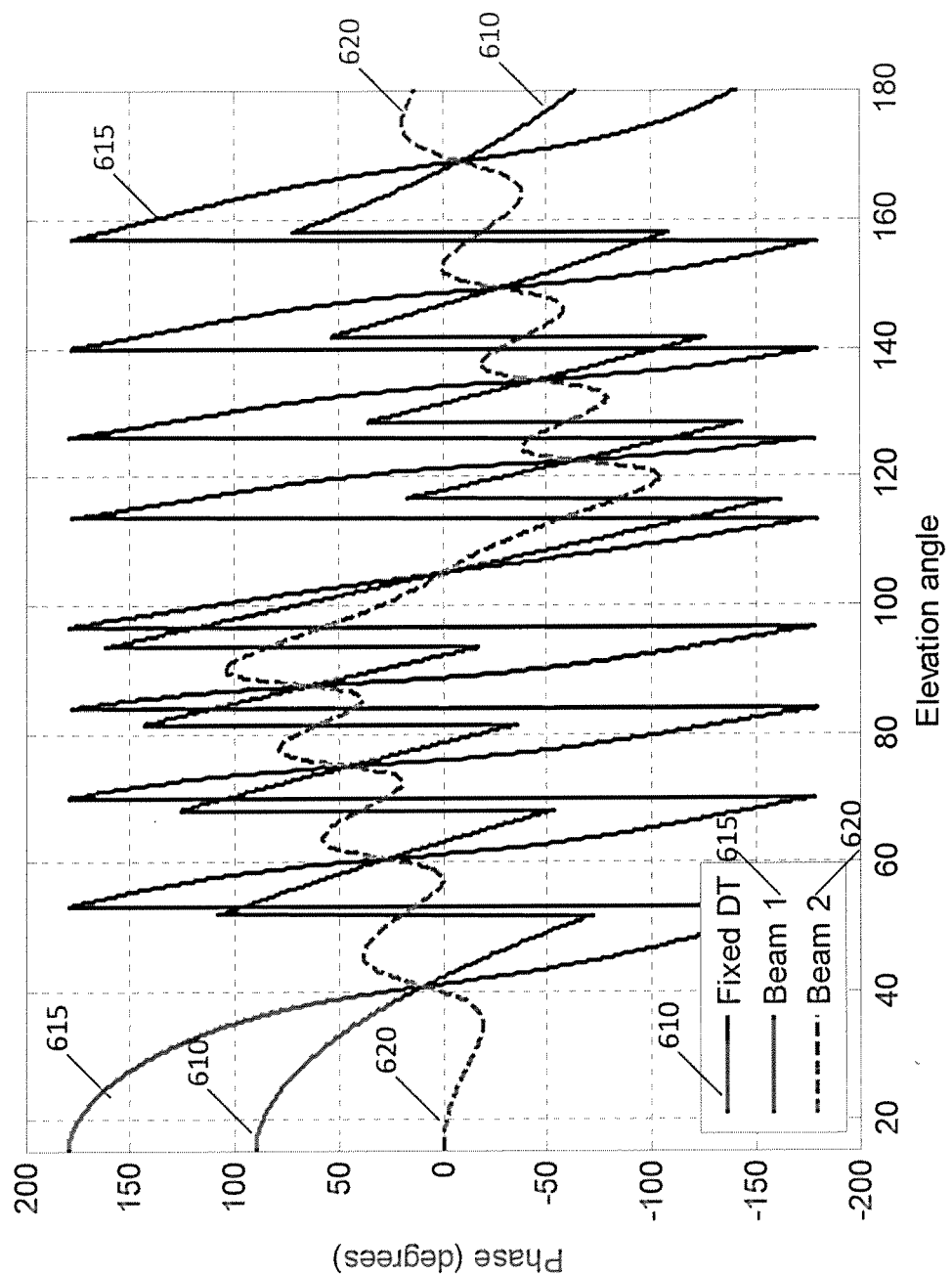
Figure 8:
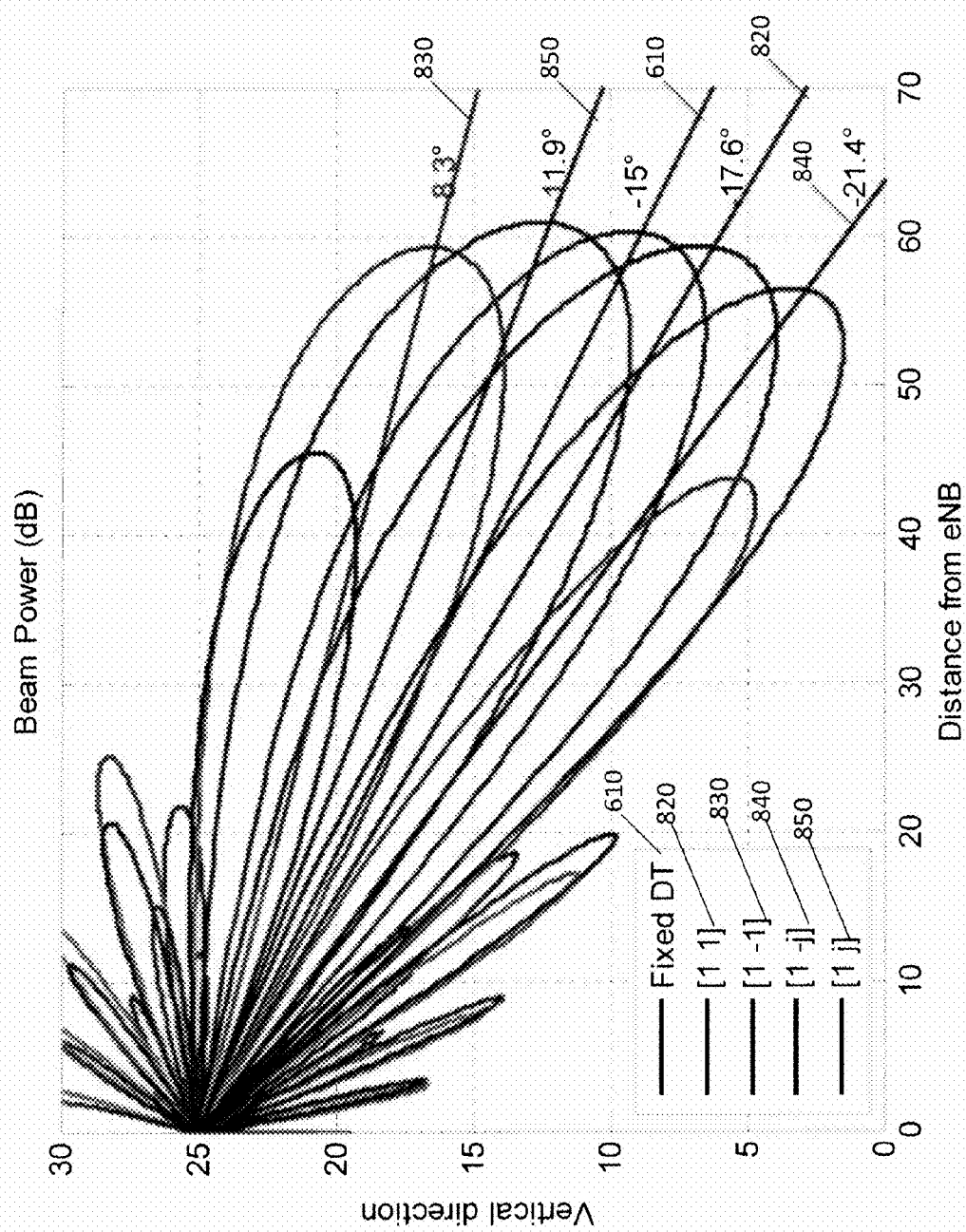
FIG. 8 is a graph illustrating how beamspace weights for the two fixed beams are phased into four different beams.

FIG. 6 is a graph of the gain of two vertical beams 615, 620 compared to a fixed downtilt beam 610 and FIG. 7 is a graph of phase of the two vertical beams 615, 620 relative to the fixed downtilt beam 610 for an example set of beamspace weights. For example if E=2, beam 1 could be the vertical beam for logical ports $P_1$ and $P_3$ and beam 2 could be the vertical beam for logical ports $P_2$ and $P_4$. This example used 10 vertical elements (half-lambda spacing). The two beams 615, 620 have the same pattern in magnitude, but the phase differences enables good steering ability as illustrated also by FIG. 8.

To control where the elevation beam points, the two elevation beams 615, 620 are phased together with elevation-port beamforming weights. The elevation-port beamforming weights are port-specific gain and phase values which are applied to the signals being transmitted out of the logical elevation ports (e.g., logical ports $P_1$ through $P_E$ or logical ports $P_{E+1}$ through $P_{2E}$). For example, see FIG. 8, when the beamspace weights shown in FIG. 6 and FIG. 7 are used to form two logical elevation ports and the signals transmitted from these logical ports are phased with four different elevation-port beamforming weights (e.g., these elevation-port weightings may be from the two-element LTE codebook). In particular an elevation-port weighting of [1 1], would create a physical beam 820 with a 17.6 degree downtilt. Using [1 1] or [1 −j] would steer interference away from a cell edge, as illustrated by physical beams 820, 840, respectively. In FIG. 2, this means the physical beams 820, 840 would be steered away from the outer edge 280 and from the capacity booster cell 105. Meanwhile, [1 −1] or [1 j] would steer interference toward the outer edge 280, as illustrated by physical beams 830, 850, respectively. In FIG. 2, this means the physical beams 830, 850 would be steered toward the outer edge 280 and toward the capacity booster cell 105. It should be noted that the [1 −j] physical beam 840 has a null in a main direction of [1 j] physical beam 850. This type of beam steering could allow beams to be steered by a coverage cell away from or toward a capacity booster cell, which could therefore adjust interference between the coverage cell 106 and capacity booster cell 105.

In addition to beam steering, there are other issues that involve interference between the coverage cell 106 and capacity booster cell 105. One such issue is enhanced inter-cell interference coordination (eICIC) in LTE Rel-10. eICIC includes time-domain IOC with Almost Blank Sub frames (ABSs, although ABS subframe(s) is also used herein) for HetNets, which are networks with macro (coverage) cells that overlie smaller (capacity-booster) cells. ABS sub frames are a subset of sub frames where the power from the coverage cell 106 is muted through a large portion of the sub frames. The coverage cell 106 will not be transmitting data typically but will transmit CRS and minimal control. The ABS sub frames are low interference sub frames for the UEs 110 attached to the capacity booster cells 105. The non-ABS subframes are a set of sub frames where the coverage cell 106 will be transmitting data. The non-ABS subframes are high interference subframes for the UEs 110 attached to the capacity booster cells 105. An "ABS pattern" indicates which subframes are ABS subframes and the ABS pattern is sent from one eNB (e.g., eNB 107 forming coverage cell 106) to another eNB (e.g., eNB 108 forming capacity booster cell 105) over a backhaul link.

Enhancements envisioned for Rel-11 include the following: Low Power Subframes (LPSs, although "LPS subframes" is also used). The LPS subframes are similar to ABS subframes of Rel-10. The coverage cell 106 eNB 107 can reduce power of the data transmissions, but cannot reduce the CRS power. The coverage cell 106 eNB 107 must inform the UEs 110 of the transmit pilot-to-data ratio value so that the CRS can be useful. Other enhancements are High Power subframes (HPSs, or HPS subframes), which are similar to the non-ABS subframes of Rel-10. In the HPS subframes, the coverage cell 106 eNB 107 transmits at full power. In ABS/LPS subframes, it is generally assumed that the coverage cell 106 will be muted (ABS for Rel-10) or low power (LPS for Rel-11).

An assumption herein is that there is nothing to prevent the coverage cell 106 from doing something more sophisticated than simply reducing transmit power (e.g., via LPS subframes) or simply not transmitting data (via ABS subframes). For instance, one potential enhancement is to use the combination of elevation beamforming with time-domain IOC or e-ICIC to create "elevation eICIC", which is an alternative to simply muting/reducing Tx power in the ABS/LPS subframes. An exemplary embodiment of elevation eICIC is that the coverage cell 106 eNB 107 will employ two elevation beamforming strategies: one set of elevation beams for the ABS LPS sub frames; and another set of elevation beams for the non-ABS/HPS subframes.

The strategy used in ABS LPS should ideally lower the interference seen by the UEs 110 attached to the capacity booster cells 105, The strategy used in the non-ABS/LPS is assumed to be appropriate for the entire coverage cell 106, Elevation beamforming strategies can be UE-specific or specific to groups of UEs 110. Elevation e-ICIC leverages the existing methodology for establishing and employing ABS/LPS patterns according to Rel-10/Rel-11. The ABS/LPS patterns will indicate in which subframes the coverage cell 106 eNB 107 will transmit with an elevation beamforming strategy that is intended to reduce interference to the UEs attached to the capacity booster cells 105. In LPS subframes, power can be reduced in addition to using the elevation beamforming strategy. In case of two carriers at the coverage cell 106 and capacity booster cell 105 (with CA), two different patterns are used. This technique is transparent to Rel-10 Rel-11 UEs and corresponding ABS/LPS methodologies.

As stated above, the coverage cell 106 eNB 107 will employ two elevation beamforming strategies: one set of elevation beams for the ABS/LPS subframes; and another set of elevation beams for the non-ABS/HPS subframes. One issue is how to separate macro-users into the two sets of beams (high interference and low interference) when using codebook feedback such as PMI. The exemplary embodiments herein provide techniques to perform this separation and to use beamforming to transmit to the users that have been separated.

As a brief introduction to codebook and UE feedback including PMI, if a UE 110 knows the preceding matrices that could be applicable as defined in a configured codebook, and the UE knows the transfer function of the channels from different antenna ports by making measurements on the RSs, the UE can determine which precoding matrix is most suitable under the current radio conditions and signal an index of this matrix via a PMI report. The UE 110 can also be configured to report a channel rank via an R1, which is calculated to maximize the capacity over the entire bandwidth, jointly selecting the preferred precoder per subband to maximize capacity on the assumption of the preferred rank and precoders. CQI values reported by the UE may also depend on the assumed rank. See Sesia et al., editors, "LTE—The UMTS Long Term Evolution: From Theory to Practice", Chapter 11, "Multiple Antenna Techniques" (Gesbert et al), §11.2.2.4, first edition (2009).

A PMI value may correspond to a single codebook index or to multiple codebook indexes. See, e.g., §7.2,4, "Precoding Matrix Indicator (PMI) definition", 3GPP TS 36.213 VI 1.2.0. The codebook entries at those codebook indexes when applied to the antenna array produce a radiation pattern for a beam, and may adjust the beam in one or both of the vertical and horizontal axes, relative to how other codebook indexes affect the beam. Codebook entries can define the phasing that is applied across the signals transmitted from the logical antennas.

Figure 11:
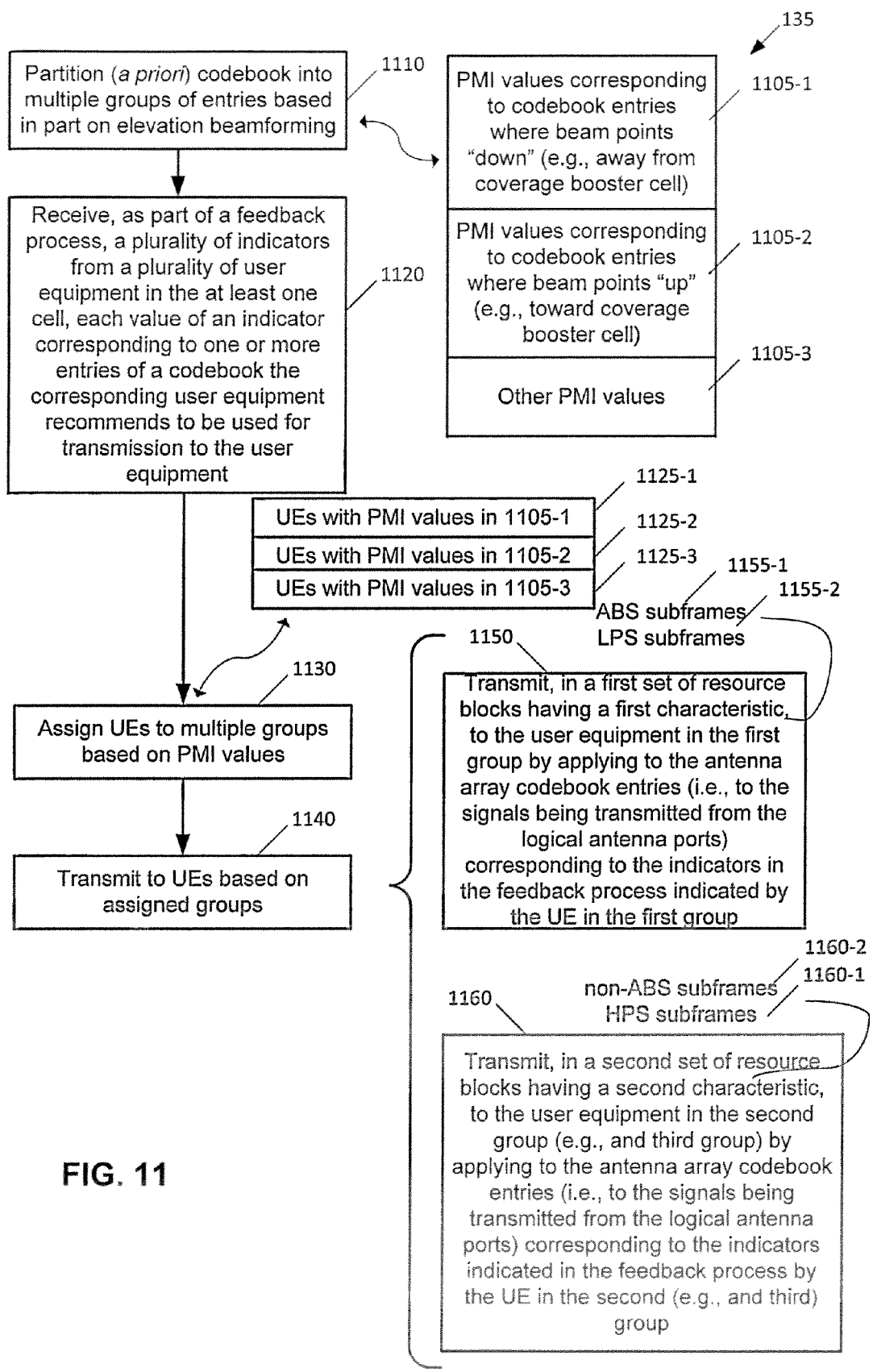
FIG. 11 is a block diagram of an exemplary logic flow diagram for codebook partitioning for enabling elevation-eICIC that illustrates the operation of an exemplary method, a result of execution of computer program instructions embodied on a computer readable memory, and/or functions performed by logic implemented in hardware, in accordance with exemplary embodiments herein.

FIG. 11 is used to illustrate an exemplary embodiment. FIG. 11 is a block diagram of an exemplary logic flow diagram for codebook partitioning for enabling elevation-eICIC. FIG. 11 also illustrates the operation of an exemplary method, a result of execution of computer program instructions embodied on a computer readable memory, and/or functions performed by logic implemented in hardware, in accordance with exemplary embodiments of this invention. It is noted that the blocks in FIG. 11 may be interconnected means to perform functions in the blocks. FIG. 11 is assumed to be performed by the elevation beam forming module 130 of the eNB 107.

As a specific example, assume that eNB 107 uses an M-azimuth×(multiplied by) E-elevation port arrangement. To be transparent with existing codebook feedback in Rel8-Rel 11 FIE. M×E must be equal to 2, 4, or 8. In the following example, it is assumed that the capacity booster cell 105 is located at the outer edge 280 (see FIG. 2), so that for low interference the elevation beam of the macro cell should point toward the center 285 or inner edge 290 of the cell 106. The eNB 107 a priori partitions (see block 1110 of FIG. 11) the codebook into, e.g., two or three groups 1105 of entries. Grouping can be based on knowledge of the antenna array in elevation, e.g., transmit manifold calibration in elevation is assumed which means that the relative phase progression across the elevation elements at baseband is the same as the relative phase progression across the elevation elements at RF (radio frequency) within a common phase value for the eNB 107. The a priori partitioning is performed as follows in an example:

A) PMIs are grouped into a first PMI group 1105-1. This first PM1 group 1105-1 has PM1 values that correspond to one or more entries from the codebook that when applied to the signals being transmitted out of the logical elevation ports (i.e., applied to the antenna arrays) produce a pattern in elevation that steers a beam "down", away from the outer edge 280. where the capacity booster cell 105 is located, and toward the inner edge 290 of the capacity booster cell 105. The steered beam should result in lower interference by the coverage cell 106 on the capacity booster cell 105.

B) PMIs are grouped into a second PMI group 1105-2. This second PMI group 1105-2 has PMI values that correspond to one or more entries from the codebook that when applied to the signals being transmitted out of the logical elevation ports (i.e., applied to the antenna arrays) produce a pattern in elevation that steers a beam nominally "up", toward the outer edge 280, where the capacity booster cell 105 is located, and away from the inner edge 290 of the capacity booster cell 105. The steered beam should result in higher interference by the coverage cell 106 on the capacity booster cell 105.

C) PMIs are grouped into a third PMI group 1105-3. The third PMI group 1105-3 has PMI values to corresponding to one or more entries from the codebook that do not fit into either of the first or second groups. In this case it is uncertain where the PMI will steer in elevation, so typically a UE that feeds back a PMI belonging to this group will only be scheduled in non-ABS subframes 1160-1 or HPS sub frames 1160-2.

In block 1120, the elevation beamforming module 130 (and the eNB 107) receives indicators from user equipment in coverage cell 106, Each value of an indicator corresponds to one or more entries of a codebook the corresponding user equipment recommends to be used for transmission to the user equipment. As described above, an indicator such as PMI is a value that corresponds to a single codebook index or to multiple codebook indexes. The codebook entries at those codebook indexes when applied to the antenna array produce a radiation pattern for a beam.

The eNB 107 assigns (block 1130) UEs to two or three groups 1125 based on PMI values:

1) A first group 1125-1 of UEs are UEs that are feeding back PMI values belonging to the first PMI group 1105-1;

2) A second group 1125-2 of UEs are UEs that are feeding back PMI values belonging to the second PMI group 1105-2; and 3) A third group 1125-3 of UEs are UEs where the PMI values fed back from the UEs belong to PMI values which are In neither the first nor the second group.

In order to leverage ABS/LPS and non-ABS HPS methodology, the following techniques may be used. In block 1140, the elevation beamforming module 130 controls the eNB 107 to transmit to UEs based on their assigned groups 1125. In block 1150, the elevation beamforming module 130 controls the eNB 107 to transmit, in a first set of resource blocks having a first characteristic 1155, to the user equipment in the first assigned group 1125-1 by applying to the antenna array codebook entries corresponding to the Indicators indicated in the feedback process by the UE in the first group. The step of applying the codebook entries to the antenna array means applying the codebook entries to the signals being transmitted from the logical antenna ports of the antenna array. As an example, in ABS subframes 1155-1 or in LPS subframes 1155-2, the coverage cell 106 eNB 107 transmits only to UEs that belong to the first UE group 1125-1. It is noted that subframes for LTE in particular include a group of resource blocks having dimensions of time, frequency, and space. See, e.g., Sesia et al., editors, "LTE—The UMTS Long Term Evolution: From Theory to Practice", Chapter 6, "Introduction to Downlink Physical Layer Design" (Matthew Baker), first edition (2009).

In block 1160, the elevation beamforming module 130 controls the eNB 107 to transmit, in second subframes having a second characteristic 1160. to the user equipment in the second group 1125-2 (e.g., and the third group 1125-3) by applying to the antenna array codebook entries corresponding to the indicators indicated in the feedback process by the UE in the second group. The step of applying the codebook entries to the antenna array means applying the codebook entries to the signals being transmitted from the logical antenna ports of the antenna array. In an exemplary embodiment, for non-ABS subframes 1160-1 or HPS subframes 1160-2, the coverage cell 106 eNB 107 transmits only to UEs that belong to both the second UE group 1125-2 and third UE group 1125-3.

The existing LTE codebooks may be used or codebooks tailored for elevation beamforming (like a product codebook which is a combination codebook, for example using a 2-bit codebook in azimuth in combination with a 2 bit codebook in elevation where the resulting codebook is the kronecker product of all combinations of the azimuth codebook by all combinations of the elevation codebook) may be used. For the elevation beamforming codebooks, the elevation portion of the codebook could be directly used to separate UEs based on the interference their selected codebook selections deliver to the capacity booster cells 105.

One issue is whether the LTE 4 Tx codebook can be partitioned. The analysis below shows that the codebook can be partitioned in a way that UEs will feedback PMI that can be assigned to the groups described above. Assume there are E=2 elevation beams (the beams shown in FIGS. 6 and 7) and M=2 azimuth antennas (co-located cross-polarized antennas). Map the elevation beams for the +45 polarization to ports 1 and 3 of the codebook and the elevation beams for the −45 polarization to ports 2 and 4 of the codebook.

Figure 9:
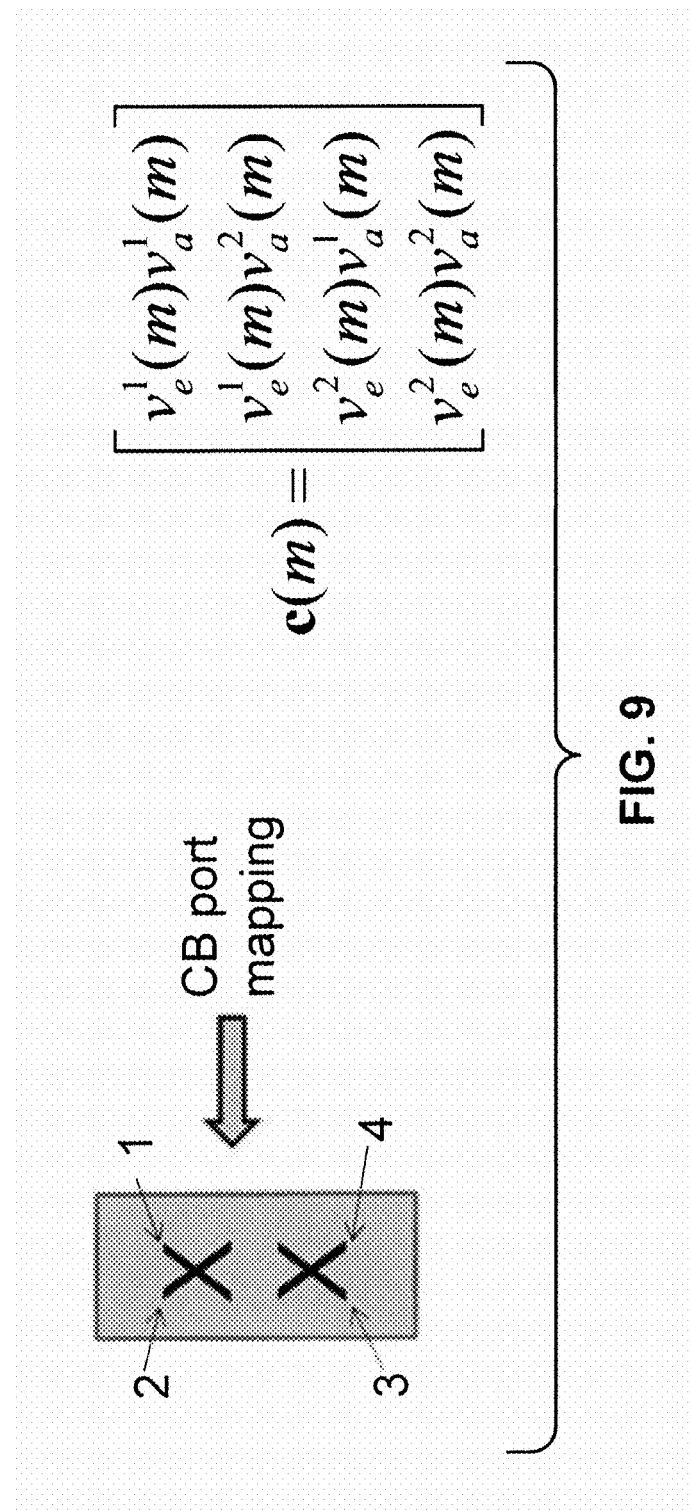
FIG. 9 illustrates a port mapping to codebook entries for an LTE 4 Tx codebook.

It is desirable that the LTE codebook to have a product structure. The product structure means that 4×1 codebook entry m, c(m), is broken up into the Kronecker product of two 2×1 vectors, $v_e$(m) and $v_a$(m), which is illustrated by FIG. 9. Using this port mapping, the 4 Tx, rank 1 Rel-8 LTE codebook can be broken up into the following elevation port beamforming weights (1-12 have the product structure, 13-16 do not):

[1 1]: indices 1, 3, 10, 12;
[1 −1]: indices 2, 4, 9, 11;
[1 j]: indices 5, 7; and
[1 −j] indices 6, 8.

Indices 13-16 do not correspond to one elevation-port beamforming weight, but to [1 1]) and [1 −1]. Note that the Kronecker product is a function of the existing LTE codebook.

Figure 10B:
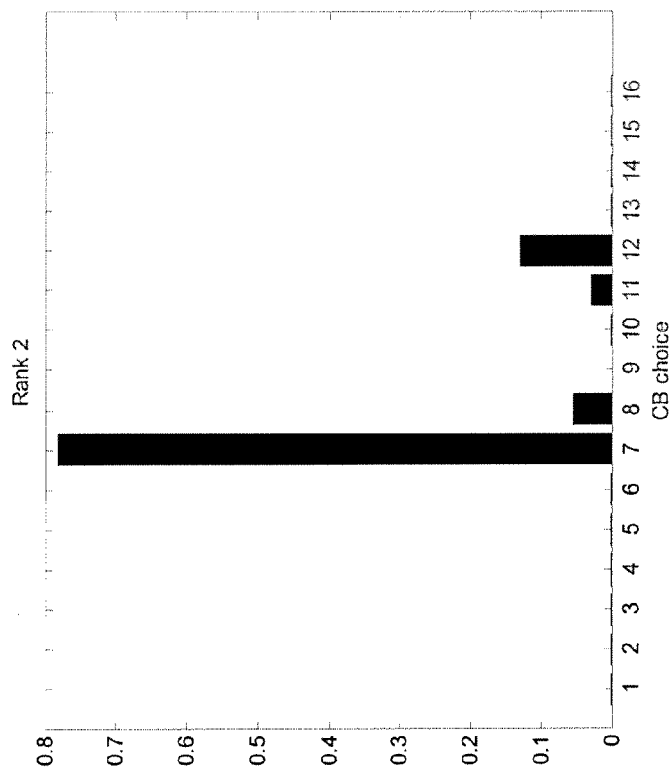
FIG. 10B is a graph illustrating codebook indices chosen by UEs for rank 2 indices.
Figure 10A:
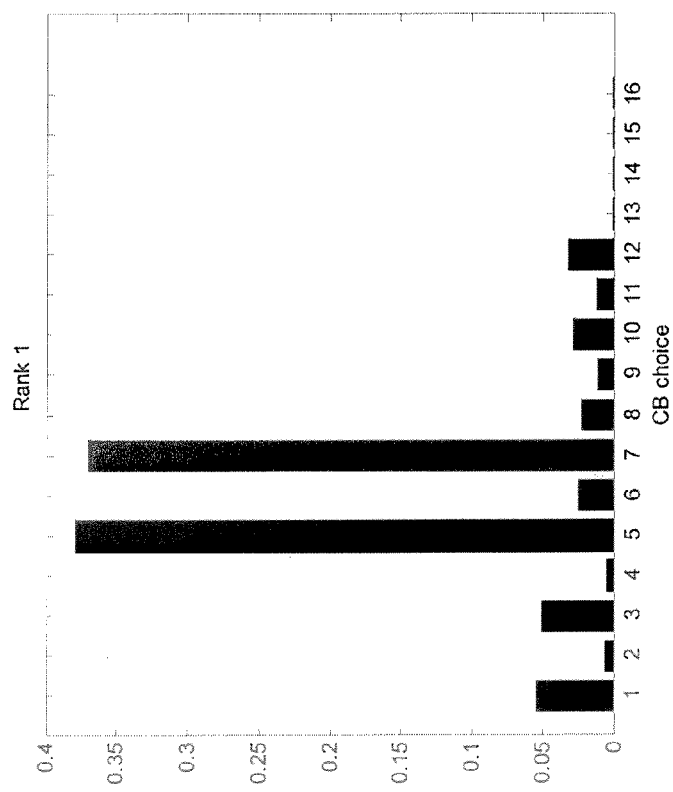
FIG. 10A is a graph illustrating codebook (CB) indices chosen by UEs for rank 1 indices.

One issue to consider is whether UEs will select codebook (CB) entries with the Kronecker product structure. FIGS. 10A and 10B are graphs illustrating the fraction of the time that codebook (CB) indices are chosen by UEs for rank 1 and rank 2, respectively. These graphs were determined based on UEs placed randomly in a cell, with the same two-elevation, two-azimuth setup previously described. The CB indices were saved for each location, and the graphs in FIGS. 10A and 10B show chosen indices for rank 1 and rank 2, respectively. All indices have product structure, except for indices 13-16 for rank 1 and indices 1-6, 9-10, 13-16 for rank 2, which do not have the product structure. That is, 99.95% of rank 1 CB choices have the Kronecker product structure, and 99.6% of rank 2 CB choices have the Kronecker product structure. Thus it is clear that the 4 transmit antenna codebook in LTE has the desired product structure and can be used to put UEs into one of the three groups. For example UEs selecting codebook indices 1, 3, 10, and 12 (elevation-port beamforming weight of [1 1]) and codebook indices 6 and 8 (elevation port beamforming weight of [1 −j]) are good candidates for the first group since, when applied to the signals being transmitted from the logical ports, they produce an elevation beam which points down (see FIG. 8.). The UEs selecting codebook indices 2, 4, 5, 7, 9, and 11 are good candidates for the second group, and UEs selecting codebook indices 13-16 are good candidates for the third group.

A number of other exemplary embodiments may be formed. For instance, different elevation beamspace beam designs may result in better partitioning characteristics of the PMI entries.

Furthermore, one can use codebook subset restrictions to further enhance the performance of elevation-eICIC:

a) A macro UE feeds back CQI and PMI for both a restricted set (codebook indices which have an elevation beam which points away from the mobile) of codebook entries and an unrestricted set of codebook entries;

b) A scheduler in the eNB 107 (forming coverage cell 106) would run as normal but with the restricted set of UEs only allowed to be scheduled during the LPS subframes;

c) The eNB 107 could limit a UE to feedback CQI and PMI for only a restricted codebook set which steers away from the edge of cell based on the eNB 107 knowing the UE location (i.e., that the UE is close to the eNB 107 and hence can be covered by elevation beams which point downward). In other words, before receiving the codebook feedback, the base station determines which user equipment is in an area away from the underlying cell (e.g., the user equipment is close to the eNB 107 and the underlying cell is near the cell edge) and requests feedback from that user equipment only from a restricted codebook set (e.g., the codebook set which steers away from the edge of cell).

The feedback process referenced above may comprise of a channel state information (CSI) process as defined in the context of Rel-11 and future UEs where a CSI process includes PMI/CQI/RI corresponding to a configured CSI-RS and an IMR. A CSI process can be associated with multiple sub frame subsets (e.g., one subset for ABS and another for non-ABS). A feedback process may comprise of a CSI-process associated with one subframe subset (if subframe subsets are configured). In the case of Rel-10 UEs, a feedback process may comprise of CSI feedback associated with a subframe subset. In the case of Rel-8 UEs, a feedback process may comprise of CSI feedback associated with one cell.

Note that a single UE may be served in different sub frames (or different resource blocks in general) with two different elevation beams. Also a UE may be assigned in the same resource block with two different beams—one for control channel (PDCCH) and another for shared data channel (PDSCH). Therefore at the scheduler in the eNB, a UE may be part of two groups—one with an elevation beam steered away from the underlay cell and another where the elevation beam is not restricted (e.g., is a nominal elevation beam).

The application of a restricted elevation beam (elevation beam steered away from the underlay cell) can be restricted to particular subframes in time domain as in the case of ABS/LPS subframes or the application may be restricted to particular resource blocks in frequency domain (e.g., particular subbands).

The scheduler in the underlay cell may be aware of the elevation domain ICIC applied in the overlay cell. If the underlay cell is aware of the resource blocks where the overlay cell will steer the elevation beam away from the underlay cell, the underlay cell can appropriately configure its served UEs with ABS/LPS patterns as in the case of eICIC for obtaining appropriate CQI feedback for multiple subframe subsets. In the case of Rel-11 and beyond, the underlay cell may configure multiple CSI processes corresponding to protected and non-protected resources by appropriately reflecting interference in multiple IMRs.

It was assumed above that the capacity booster cell 105 is located at the cell outer edge 280 (see FIG. 2), so that for low interference the elevation beam of the macro should point toward the center 285 of the cell 106 and toward the inner edge 290 of the cell 106, However, the capacity booster cell 105 could also be located toward the inner edge 290 of the coverage cell 106, and for low interference the elevation beam of the macro cell should point toward the center 285 of the cell 106 and toward the outer edge 280 of the cell 106.

Embodiments of the present invention may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memory(ies) 155 or other device) that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:
ABS Almost-Blank Subframes
CA Carrier Aggregation
CB CodeBook
CL Closed Loop
CQI Channel Quality Indicator
CRS Common Reference Symbols
CSI-RS Channel state information reference signal (non zero-power)
eICIC enhanced ICIC
eNB evolved Node B (e.g., LTE base station)
FeICIC Further enhanced ICIC
HetNet Heterogeneous Network
ICIC Inter-Cell Interference Coordination
IMR Interference Measurement Resources
LPS Low Power Subframes
LTE Long Term Evolution
MIMO Multiple Input, Multiple Output
MU Multi-User
PDCCH Physical Downlink Control CHannnel
PDSCH Physical Downlink Shared CHannel
PMI Precoding Matrix Indicator
Rel Release
RF Radio Frequency
RI Rank Indicator
RS Reference Signal
Rx Reception or Receiver
SU Single-User
Tx Transmission or Transmitter
Xpol Cross-polarize or polarized

What is claimed is:

1. A method, comprising:
receiving in a feedback process, at a base station forming at least one cell having a coverage area that at least partially overlies a coverage area of an underlying cell, a plurality of indicators from a plurality of user equipment in the at least one cell, each value of an indicator corresponding to one or more entries of a codebook the corresponding user equipment recommends to be used for transmission to the user equipment;
assigning the user equipment to a plurality of groups, the plurality of groups comprising a first group of user equipment having values of indicators corresponding to first codebook entries that when applied to an antenna array produce a pattern in elevation that steers a beam away from the underlying cell, and a second group of user equipment having values of indictors corresponding to second codebook entries that are different from the first codebook entries;
transmitting, in a first set of resource blocks having a first characteristic, to the user equipment in the first group by applying to the antenna array the codebook entries corresponding to the indicators indicated in the feedback process by the user equipment in the first group; and
transmitting, in a second set of resource blocks having a second characteristic, to the user equipment in the second group by applying to the antenna array the codebook entries corresponding to the indicators indicated in the feedback process by the user equipment in the second group,
where the first characteristic and the second characteristic are different.

2. The method of claim 1, where assigning the user equipment to a plurality of groups is based on one or both of the values of the indicators or locations of the user equipment.

3. The method of claim 1, where the first set of resource blocks having a first characteristic have the characteristic of being almost blank subframes.

4. The method of claim 1, where the first set of resource blocks having a first characteristic have the characteristic of being low power subframes.

5. The method of claim 1, where a single user equipment is assigned to two groups, one group where the first set of resource blocks have a first characteristic of being almost blank subframes, and another group where the second set of resource blocks have a second characteristic of being non-almost blank subframes.

6. The method of claim 1, where the plurality of indicators are codebook feedback, and where before receiving the codebook feedback, the base station requests codebook feedback from the user equipment, the codebook feedback from two codebook sets, an unrestricted set and a restricted set.

7. The method of claim 1, where the plurality of indicators are codebook feedback, and where before receiving the codebook feedback, the base station determines which user equipment is in an area away from the underlying cell and requests codebook feedback from that user equipment only from a restricted codebook set.

8. The method of claim 1, where:
the underlying cell is near an outer edge of the at least one cell;
the first group of user equipment have values of indictors corresponding to codebook entries that when applied to the antenna array produce a pattern in elevation that steers the beam away from the underlying cell and toward a center and an inner edge of the at least one cell; and the second group of user equipment have values of indictors corresponding at least to codebook entries that when applied to the antenna array produce a pattern in elevation that steers the beam toward the underlying cell and toward the outside edge of the at least one cell.

9. The method of claim 1, where:
the underlying cell is near an inner edge of the at least one cell;
the first group of user equipment have values of indictors corresponding to codebook entries that when applied to the antenna array produce a pattern in elevation that steers the beam away from the underlying cell and toward a center and an outer edge of the at least one cell; and
the second group of user equipment have values of indictors corresponding at least to codebook entries that when applied to the antenna array produce a pattern in elevation that steers the beam toward the underlying cell and toward the inner edge of the at least one cell.

10. The method of claim 1, where each of the plurality of indicators is a precoding matrix indicator.

11. The method of claim 1, where:
the plurality of groups further comprise a third group of user equipment having values of indicators corresponding to codebook entries that do not fit into the first or second groups of user equipment.

12. The method of claim 11, wherein:
the method further comprises, prior to assigning, partitioning the codebook into multiple groups of entries based in part on elevation beamforming, where:
a first group of entries comprises values that correspond to one or more entries from the codebook that when applied to the antenna array produce a pattern in elevation that steers a beam away from the underlying cell;
the second group of entries comprises values that correspond to one or more entries from the codebook that when applied to the antenna array produce a pattern in elevation that steers the beam toward the underlying cell; and
a third group of entries comprises values to corresponding to one or more entries from the codebook that do not fit into either of the first or second groups of entries; and
assigning uses the first, second, and third groups of entries to assign the user equipment into groups of user equipment.

13. An apparatus, comprising:
one or more processors; and
one or more memories including computer program code, the one or more memories and the computer program code configured, with the one or more processors, to cause the apparatus to perform at least the following:
receiving in a feedback process, at a base station forming at least one cell having a coverage area that at least partially overlies a coverage area of an underlying cell, a plurality of indicators from a plurality of user equipment in the at least one cell, each value of an indicator corresponding to one or more entries of a codebook the corresponding user equipment recommends to be used for transmission to the user equipment;
assigning the user equipment to a plurality of groups, the plurality of groups comprising a first group of user equipment having values of indicators corresponding to first codebook entries that when applied to an antenna array produce a pattern in elevation that steers a beam away from the underlying cell, and a second group of user equipment having values of indictors corresponding to second codebook entries that are different from the first codebook entries;
transmitting, in a first set of resource blocks having a first characteristic, to the user equipment in the first group by applying to the antenna array the codebook entries corresponding to the indicators indicated in the feedback process by the user equipment in the first group; and
transmitting, in a second set of resource blocks having a second characteristic, to the user equipment in the second group by applying to the antenna array the codebook entries corresponding to the indicators indicated in the feedback process by the user equipment in the second group,
where the first characteristic and the second characteristic are different.

14. The apparatus of claim 13, where assigning the user equipment to a plurality of groups is based on one or both of the values of the indicators or locations of the user equipment.

15. The apparatus of claim 13, where the first set of resource blocks having a first characteristic have the characteristic of being almost blank subframes.

16. The apparatus of claim 13, where the first set of resource blocks having a first characteristic have the characteristic of being low power subframes.

17. The apparatus of claim 13, where a single user equipment is assigned to two groups, one group where the first set of resource blocks have a first characteristic of being almost blank subframes, and another group where the second set of resource blocks have a second characteristic of being non-almost blank subframes.

18. The apparatus of claim 13, where the plurality of indicators are codebook feedback, and where before receiving the codebook feedback, the base station requests codebook feedback from the user equipment, the codebook feedback from two codebook sets, an unrestricted set and a restricted set.

19. The apparatus of claim 13, where the plurality of indicators are codebook feedback, and where before receiving the codebook feedback, the base station determines which user equipment is in an area away from the underlying cell and requests codebook feedback from that user equipment only from a restricted codebook set.

20. The apparatus of claim 13, where:
the underlying cell is near an outer edge of the at least one cell;
the first group of user equipment have values of indictors corresponding to codebook entries that when applied to the antenna array produce a pattern in elevation that steers the beam away from the underlying cell and toward a center and an inner edge of the at least one cell; and
the second group of user equipment have values of indictors corresponding at least to codebook entries that when applied to the antenna array produce a pattern in elevation that steers the beam toward the underlying cell and toward the outside edge of the at least one cell.

21. The apparatus of claim 13, where:
the underlying cell is near an inner edge of the at least one cell;
the first group of user equipment have values of indictors corresponding to codebook entries that when applied to the antenna array produce a pattern in elevation that steers the beam away from the underlying cell and toward a center and an outer edge of the at least one cell; and the second group of user equipment have values of indicators corresponding at least to codebook entries that when applied to the antenna array produce a pattern in elevation that steers the beam toward the underlying cell and toward the inner edge of the at least one cell.

22. The apparatus of claim 13, where each of the plurality of indicators is a precoding matrix indicator.

23. The apparatus of claim 13, where:
the plurality of groups further comprise a third group of user equipment having values of indicators corresponding to codebook entries that do not fit into the first or second groups of user equipment.

24. The apparatus of claim 23, wherein:
the one or more memories and the computer program code are further configured, with the one or more processors, to cause the apparatus to perform at least the following:
prior to assigning, partitioning the codebook into multiple groups of entries based in part on elevation beamforming, where:
a first group of entries comprises values that correspond to one or more entries from the codebook that when applied to the antenna array produce a pattern in elevation that steers a beam away from the underlying cell;
the second group of entries comprises values that correspond to one or more entries from the codebook that when applied to the antenna array produce a pattern in elevation that steers the beam toward the underlying cell; and
a third group of entries comprises values to corresponding to one or more entries from the codebook that do not fit into either of the first or second groups of entries; and
assigning uses the first, second, and third groups of entries to assign the user equipment into groups of user equipment.

25. A computer program product comprising a non-transitory computer-readable storage medium bearing computer program code embodied therein for use with a computer, the computer program code comprising:
code for receiving in a feedback process, at a base station forming at least one cell having a coverage area that at least partially overlies a coverage area of an underlying cell, a plurality of indicators from a plurality of user equipment in the at least one cell, each value of an indicator corresponding to one or more entries of a codebook the corresponding user equipment recommends to be used for transmission to the user equipment;
code for assigning the user equipment to a plurality of groups, the plurality of groups comprising a first group of user equipment having values of indicators corresponding to first codebook entries that when applied to an antenna array produce a pattern in elevation that steers a beam away from the underlying cell, and a second group of user equipment having values of indicators corresponding to second codebook entries that are different from the first codebook entries;
code for transmitting, in a first set of resource blocks having a first characteristic, to the user equipment in the first group by applying to the antenna array the codebook entries corresponding to the indicators indicated in the feedback process by the user equipment in the first group; and
code for transmitting, in a second set of resource blocks having a second characteristic, to the user equipment in the second group by applying to the antenna array the codebook entries corresponding to the indicators indicated in the feedback process by the user equipment in the second group,
where the first characteristic and the second characteristic are different.

* * * * *

UNITED STATES PATENT AND TRADEMARK OFFICE
CERTIFICATE OF CORRECTION

| | | |
|---|---|---|
| PATENT NO. | : 9,136,995 B2 | Page 1 of 1 |
| APPLICATION NO. | : 13/908548 | |
| DATED | : September 15, 2015 | |
| INVENTOR(S) | : Thomas et al. | |

It is certified that error appears in the above-identified patent and that said Letters Patent is hereby corrected as shown below:

In the claims

Claim 24, col. 17, line 18 "beamfonning" should be deleted and --beamforming-- should be inserted.

Signed and Sealed this
Fifteenth Day of December, 2015

Michelle K. Lee
*Director of the United States Patent and Trademark Office*